Jan. 16, 1940. T. P. LOHRMAN 2,186,937
WINDOW CONSTRUCTION FOR VEHICLE BODIES

Filed Aug. 4, 1937

INVENTOR

Thomas Paul Lohrman

Patented Jan. 16, 1940

2,186,937

UNITED STATES PATENT OFFICE 2,186,937

WINDOW CONSTRUCTION FOR VEHICLE BODIES

Thomas Paul Lohrman, San Francisco, Calif.

Application August 4, 1937, Serial No. 157,327

1 Claim. (Cl. 296—44)

The invention relates to windows for vehicle bodies, and more particularly to stationary windows mounted in a rubber insulation strip.

With the present type of construction for windows of this kind, it is the common practice to employ a rubber channel insulation strip for insulating the glass from the metal. The outer half of the rubber channel is usually exposed either partially or entirely to the weather and sun's rays. This causes rapid deterioration of the rubber thus exposed, and results in an unsightly appearance, and the window becomes subject to leaks during rainy weather. One of the objects of the present invention is to overcome these objectionable features.

Another object is to provide a window construction whereby the window panel will be substantially flush with the adjacent body panel members.

Still another object is to provide a suitable antenna for radio installation within the vehicle body.

The accomplishment of these objects, as well as other improvements are obviously attained through the construction as shown in the drawing which forms a part of this application, and in which.

Figure 2:
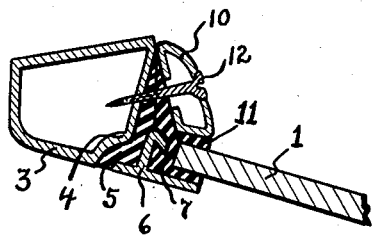
Fig. 2 is an enlarged cross-sectional view taken substantially on line 2—2 of Fig. 1.

As indicated in the drawing, 1 and 2 are glass panels which are mounted in the front panel 3 of a vehicle body; said front panel 3 being preferably made of sheet metal and having its edge portion adjacent the glass panel bent inwardly to form an offset flange 4, Fig. 2. To this offset flange 4 is cemented a resilient rubber insulation strip 5.

The metallic strip 6 is preferably made of brass or copper alloy so that it may serve an added purpose of providing a radio antenna. Said strip 6 has a hook-like flange portion for locking with insulation strip 7; said insulation strip 7 is cemented or otherwise joined to insulation strip 5 and locks strip 6 firmly in place.

In addition to shielding the insulation material, the metallic strip 6 also acts as a retainer strip for glass panels 1 and 2, taking any outward thrust of said panels 1 and 2. This is an obvious improvement over conventional methods of mounting glass panels in vehicle bodies. Any vehicle body, whether travelling over rough highways, or parked on an uneven place, is subjected to twisting or distortion of its frame members. The framework surrounding large glass panels is in nowise free from this distortion, and for this reason, stationary glass panels must have resilient mountings, otherwise cracking or breakage will result.

A brief study of Fig. 2 will emphasize the importance of providing a resilient mounting for such glass panels. The metallic strip 6 being suspended by a resilient insulation material cannot transmit a twisting or distortion from frame member 3 to glass panel 1.

Figure 1:
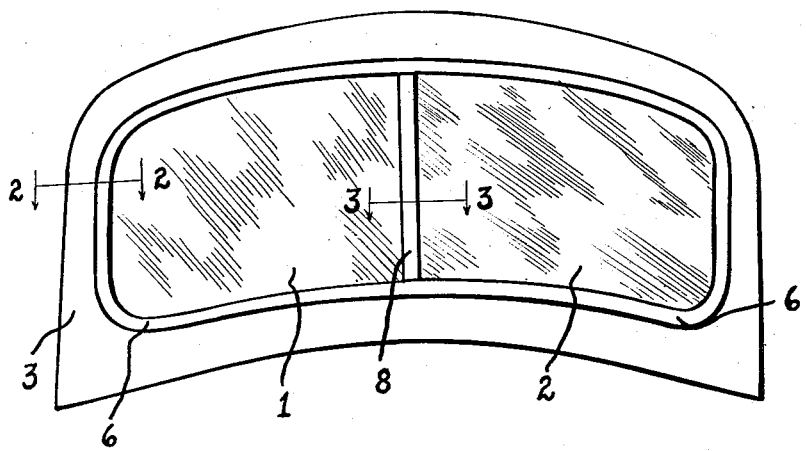
Fig. 1 is an elevational view of a type of windshield commonly used in motor vehicle bodies.
Figure 3:
Fig. 3 is an enlarged cross-sectional view taken substantially on line 3—3 of Fig. 1.

Glass panels 1 and 2 are easily mounted in position by first inserting the proper edge portions thereof into the center strip 8, Fig. 3, then they may be pressed firmly into place against the insulation strip 7. Insulation strips 9 may be cemented to the edges of glass panels 1 and 2 previous to insertion into center strip 8.

A garnish moulding 10 is employed to hold glass panels 1 and 2 in place; said moulding 10 being insulated from panels 1 and 2 by a rubber or cork strip 11; said moulding 10 being securely held in place by screws 12.

While the drawing shows a windshield having a division down the center, this construction may be used equally as well for a one piece windshield, and also for back glass or side glass in a vehicle body wherever a stationary glass is desired.

It is noted that the center strip 8 is extremely narrow in proportion to the ones commonly employed at present. Thus the vision is not obstructed at this point; this being made possible by the use of a one-piece center strip instead of the customary two-piece strip.

Having thus described my invention, what I wish to secure by Letters Patent, is:

Means for securing a glass panel within the surrounding framework, comprising; a resilient insulation material separating the edge portions of said glass panel from said framework; a garnish moulding secured to said framework along the inner edge portions of said glass panel for resisting the inward thrust of said glass panel; and a metallic strip having a hooked engagement with said resilient insulation material, said strip surrounding the outer edge portions of said glass panel and acting as a resistance to any outward thrust of said glass panel; said strip also serving as a shield for said insulation material.

THOMAS PAUL LOHRMAN.